United States Patent [19]

Gooding

[11] 3,958,308
[45] May 25, 1976

[54] QUICK-RELEASE FASTENERS
[75] Inventor: Trevor F. J. Gooding, Guildford, England
[73] Assignee: Dzus Fastener Co., Inc., West Islip, N.Y.
[22] Filed: Mar. 21, 1975
[21] Appl. No.: 560,347

[30] Foreign Application Priority Data
Apr. 29, 1974 United Kingdom............... 18644/74

[52] U.S. Cl. ........................................... 24/221 K
[51] Int. Cl.² ...................................... A44B 17/00
[58] Field of Search ..................................... 24/221

[56] References Cited
UNITED STATES PATENTS
619,809  2/1899  Unser............................ 24/221 R
2,580,666  1/1952  Dzus............................. 24/221 K
3,220,078  11/1965  Preziosi........................ 24/221 L FOREIGN PATENTS OR APPLICATIONS
851,913  9/1970  Canada......................... 24/221 K Primary Examiner—Donald A. Griffin
Attorney, Agent, or Firm—Kane, Dalsimer, Kane, Sullivan and Kurucz

[57] ABSTRACT

The invention relates to a resilient plastics retaining sleeve for a stud assembly of a quick release fastener for holding a panel on a support member and consisting of two parts, a stud and a retaining member or receptacle. The sleeve comprises a substantially cylindrical portion having at one end an inwardly directed annular lip and at its other end a shoulder. A pair of legs extends in the general direction of the sleeve axis and each of the legs includes at its free end an outwardly directed flange so that, in use, the legs may be brought together and inserted through an aperture in a panel on which the sleeve is to be mounted. The legs spring outwards again after its insertion due to their resilience and the leg flanges then engage the rear surface of the panel to retain the sleeve thereon and the shoulder engages the front surface of the panel to prevent the cylindrical portion of the sleeve passing through the aperture.

3 Claims, 5 Drawing Figures

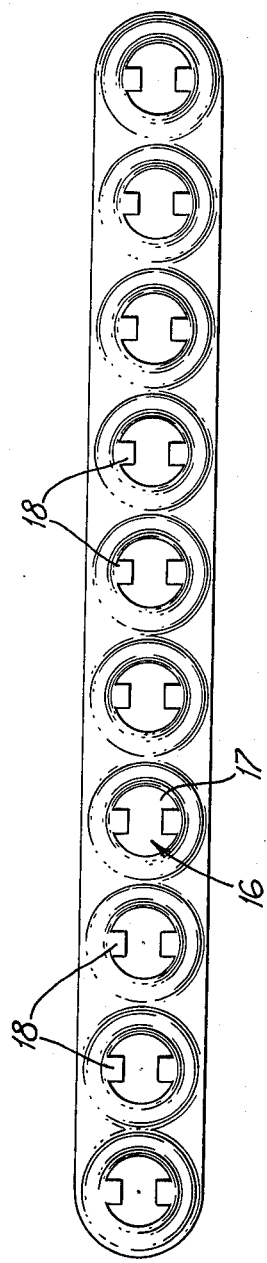
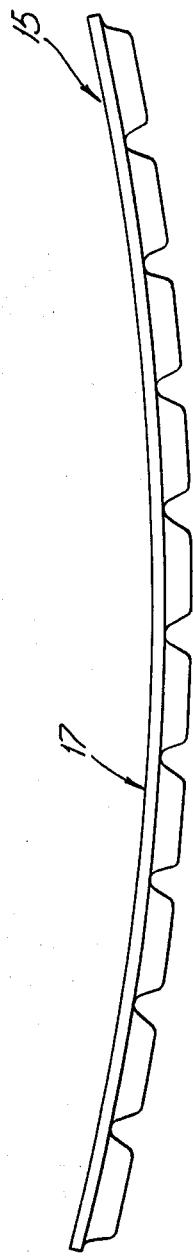

QUICK-RELEASE FASTENERS

The present invention relates to quick-release fasteners, which are used for holding a panel on a support member, and which consist of two parts, a stud and a retaining member or receptacle. In use, a shank of the stud passes through aligned holes in the panel and support member and cooperates by relative rotation with the retaining member which is often secured to the back of the support. (Such a fastener is hereinafter referred to as of the kind described.) The stud may be captive, but is rotatable in the opening in the panel. With fasteners of this type the panel and support may be secured together without providing access to the receptacle at the back of the support.

Miniature versions of this type of fastener are often used for holding the front panel of a piece of electrical equipment to the frame. In such applications the fasteners may be small since there are no great loads which have to be withstood by them.

In fasteners of this type the retaining member or receptacle is often simply a metal blank through which there is an aperture having two diametrically opposed tab-like projections which, in use, cooperate with two cam slots cut in the shank of the stud part of the fastener. In order to prevent the fastener from becoming undone the stud part of the fastener has a biasing spring biasing the stud away from the receptacle so that the tab-like projections of the receptacle are held firmly at the ends of the cam slots of the stud shank. This is normally accomplished by providing the stud with an enlarged head portion which often has a slot for a screwdriver, and a coil spring surrounding the stud shank and bearing against the face of the panel to be secured and against the underside of the stud head, thus biasing the stud outwards.

In order that the stud part of the fastener is not lost when the front panel is removed for example, the stud is often made captive whilst still allowing rotation. Various ways of doing this are known, but most of them requie special tools or operations which is a serious disadvantage in those cases where the studs are inserted into the panels by the user himself since the particular equipment must be on hand.

According to the present invention we provide a resilient plastics retaining sleeve for a stud assembly of a fastener of the kind described, the sleeve comprising a substantially cylindrical portion, having at one end an inwardly directed annular lip and at its other end a shoulder and a pair of legs extending in the general direction of the sleeve axis, each of the legs having at its free end an outwardly directed flange, whereby, in use, the legs may be brought together and inserted through an aperture in a panel on which the sleeve is to be mounted, the legs springing outwards again after insertion, as a result of their resilient nature, the leg flanges then engaging the rear surface of the panel to retain the sleeve thereon and the shoulder engaging the front surface of the panel to prevent the cylindrical portion of the sleeve passing through the aperture.

Preferably, the sleeve legs have a thicker cross section than the main wall of the sleeve in order that they may be sufficiently strong not to buckle and flex inwardly under the coupling force between the stud and the receptacle. To provide the stud with the necessary outwards biasing a helical spring may be inserted in the cup after this has been mounted at the aperture, one end of the spring bearing against the face of the panel adjacent the aperture and the other end bearing against the undersurface of the stud head. The invention also includes a stud assembly comprising a sleeve as described above, a helical spring inserted within the sleeve, and a stud.

Furthermore, the invention includes a fastener incorporating such a stud assembly.

Two examples of fasteners according to the invention will now be described with reference to the accompanying drawings in which:

FIG. 4 is a plan view of the receptacle strip of either of the fasteners; and,

FIG. 5 is a side view of the same receptacle strip.

Figure 1:
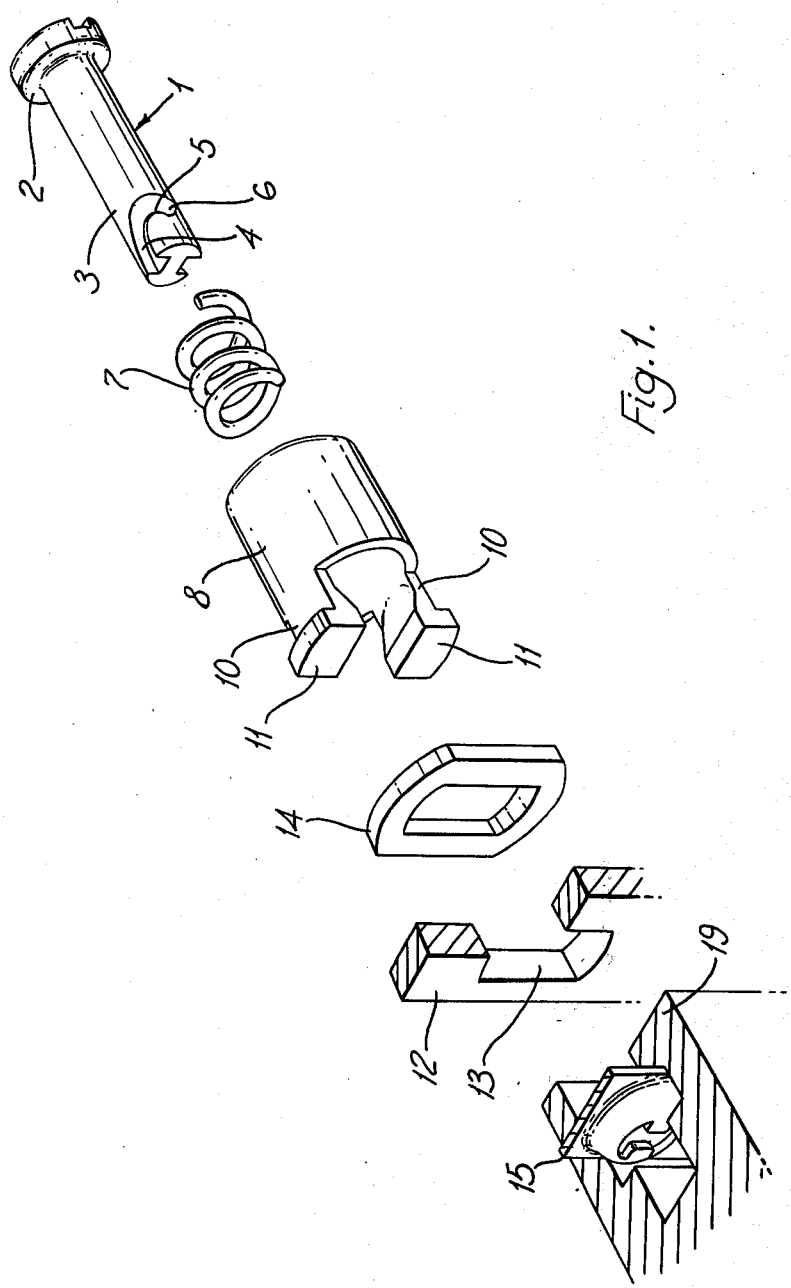
FIG. 1 is an exploded perspective view of a first fastener.

Both fasteners shown include a stud 1 having a slotted circular head 2 and a substantially cylindrical shank 3 in which are provided two substantially helical slots 4 having a camming portion 5 and locking detent 6 at one end.

A helical coil spring 7 is provided which in use surrounds the shank of the stud.

In order to retain the stud on a panel a resilient, substantially cylindrical, plastics sleeve 8 is provided within which the stud 1 is a snap fit axially, the stud being pushed past an internal annular lip 9 at one end of the sleeve 8.

Figure 2:
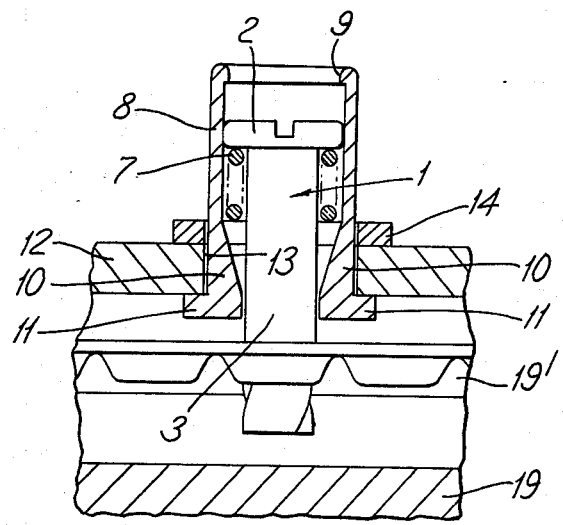
FIG. 2 shows the same fastener in use, fastening together a panel and a support.

In the first example, shown in FIGS. 1 and 2 the sleeve includes two legs 10 at its other end, extending in the general direction of the sleeve axis. Each of the legs has its free end and outwardly extending flange 11.

In order to retain the stud 1 on a panel 12, before the stud is pushed into the sleeve 8, the legs 10 of the sleeve are pushed inwardly towards one another and are then pushed through the slotted hole 13 in the panel 12. Depending on the thickness of the panel 12 a similarly slotted spacer washer 14 may also be provided around the legs of the sleeve. This spacer washer 14 is provided to ensure that when the panel 12 is thinner than the thickness for which the fastener is designed the fastener will be just as effective as when used on a panel of more suitable thickness.

After the legs of the sleeve have been pushed through the slot 13 in the panel, the resilient nature of the plastics material allows them to spring outwards so that the flanges 11 engage the back surface of the panel 12 to prevent the sleeve 8 from being pulled out. In order to further ensure this the legs 10 are thickened out from the relative thin wall of the sleeve 8 to provide the necessary strength in the legs to prevent them breaking or buckling if the sleeve is pulled outwards.

The sleeve 8 is prevented from being pushed completely through the aperture 13 in the panel 12 by the lower end of the cylindrical sleeve, which forms a shoulder, abutting the front surface of the panel around the slot. To complete the assembly of the stud on the panel the helical spring 7 is inserted in the sleeve and the stud 1 itself is then inserted, shank first, into the sleeve. The head of the stud is pushed past the inwardly directed annular lip 9 so that the head is retained within the sleeve on the other side of the flange.

The other half of the fastener, the retaining member, is formed as one of a series in a metal strip 15. The retaining member 16, itself, is, in each case, a cupshaped aperture 17, formed in the metal strip and having opposed tabs 18 extending diametrically across the aperture for cooperation with the helical slots 4 in the shank of the stud. This particular configuration of receptacle is particularly useful where any one of a number of different front plates require to be mounted on a frame member and where these different front plates have their fastenings at different positions. The strip of receptacles can thus be mounted in a C-shaped groove 19', the opening of which faces outwardly of the frame member 19. In order that the strip may be held in position in the groove it can be formed in a bow, as shown in FIG. 5 so as to bear against the opposed surfaces of the groove and thus retain itself in position.

In order to lock the two halves of the fastener together all that is necessary is for the end of the shank of the stud to be brought against the receptacle strip, the cup shape of the aperture guiding the stud into the aperture, and subsequent rotation of the stud ensuring engagement of the receptacle tabs with the cam slots. As the stud is rotated so the tabs pass over the camming surfaces 5 in the slots and into the locking detents 6. The stud and retaining member or receptacle are held together by the biasing action of the spring 7 which tries to force the tabs 18 away from the stud, this of course ensuring that the tabs are firmly held in the locking detents 6.

Figure 3:
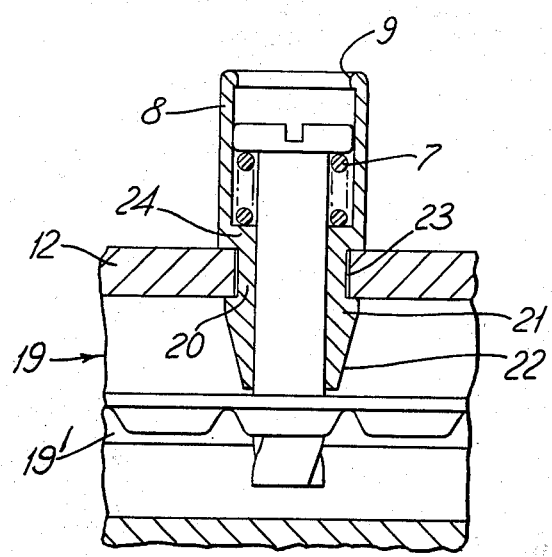
FIG. 3 shows a second fastener, again in its fastened position, fastening together a panel and a support.

The fastener shown in FIG. 3 is very similar to the first fastener, but the sleeve 8 in this case includes legs 20 which extend away from the bottom end of the cylindrical part of the sleeve, inwardly offset from the edge of the sleeve. Furthermore, the legs 20, whilst still including a flange 21, are elongate and have tapering surfaces 22 so that in order to locate the sleeve on a panel 12 it is no longer necessary to deflect the legs inwardly. A simple axial push of the sleeve into the aperture deflects the legs by means of the tapering surfaces 22 which act as camming surfaces on pushing of the sleeve into the slot. The positioning of the legs and the flanges 21 thus produces a recess 23 within which the edges of the aperture in the panel are retained. If a panel of smaller thickness is used, then it is again possible to use a spacer washer 14.

Another difference between the fastener shown in FIG. 3 and that shown in FIGS. 1 and 2 is that the spring 7, instead of bearing on the panel 12 or, where one is used, spacer washer 14, bears on an inner shoulder 24 at the bottom end of the cylindrical part of the sleeve 8.

I claim:

1. A resilient plastics retaining sleeve for a stud assembly of a quick release fastener, said sleeve comprising a substantially cylindrical portion, said portion having at one end an inwardly directed annular lip and at its other end a shoulder and a pair of legs extending in the general direction of said sleeve axis, each of said legs having at its free end an outwardly directed flange, whereby, in use, said legs may be brought together and inserted through an aperture in a panel on which said sleeve is to be mounted, said legs springing outwards again after insertion, as a result of their resilient nature, said leg flanges then engaging said rear surface of said panel to retain said sleeve thereon, said shoulder engaging said front surface of said panel to prevent said cylindrical portion of said sleeve passing through said aperture, and said legs having a greater thickness than the cylindrical portion to strengthen the legs and to prevent them from breaking or buckling when the sleeve is subjected to an outward pull and to form a guideway for a stud.

2. The invention in accordance with claim 1 wherein each of the legs includes a chamferred surface to enable said legs to be pushed into an aperture, said legs being forced toward one another to allow them to pass through said aperture.

3. A quick release fastener comprising; a stud assembly including a resilient plastics retaining sleeve having a substantially cylindrical portion, said portion having at one end an inwardly directed annular lip and at its other end a shoulder and a pair of legs extending in the general direction of said sleeve axis, each of said legs having at its free end an outwardly directed flange, whereby, in use, said legs may be brought together and inserted through an aperture in a panel on which said sleeve is to be mounted, said legs springing outwards again after insertion, as a result of their resilient nature, said leg flanges then engaging said rear surface of said panel to retain said sleeve thereon, said shoulder engaging said front surface of said panel to prevent said cylindrical portion of said sleeve passing through said aperture, a helical spring disposed within said cylindrical portion of said sleeve and a stud held captive within said sleeve, a receptacle for said stud assembly with said receptacle including an aperture through which one end of said stud is arranged, in use, to extend, and a pair of opposed tabs extending diametrically across said aperture for cooperation with a pair of cam slots in the shank of said stud.

* * * * *